Patented Aug. 16, 1927.

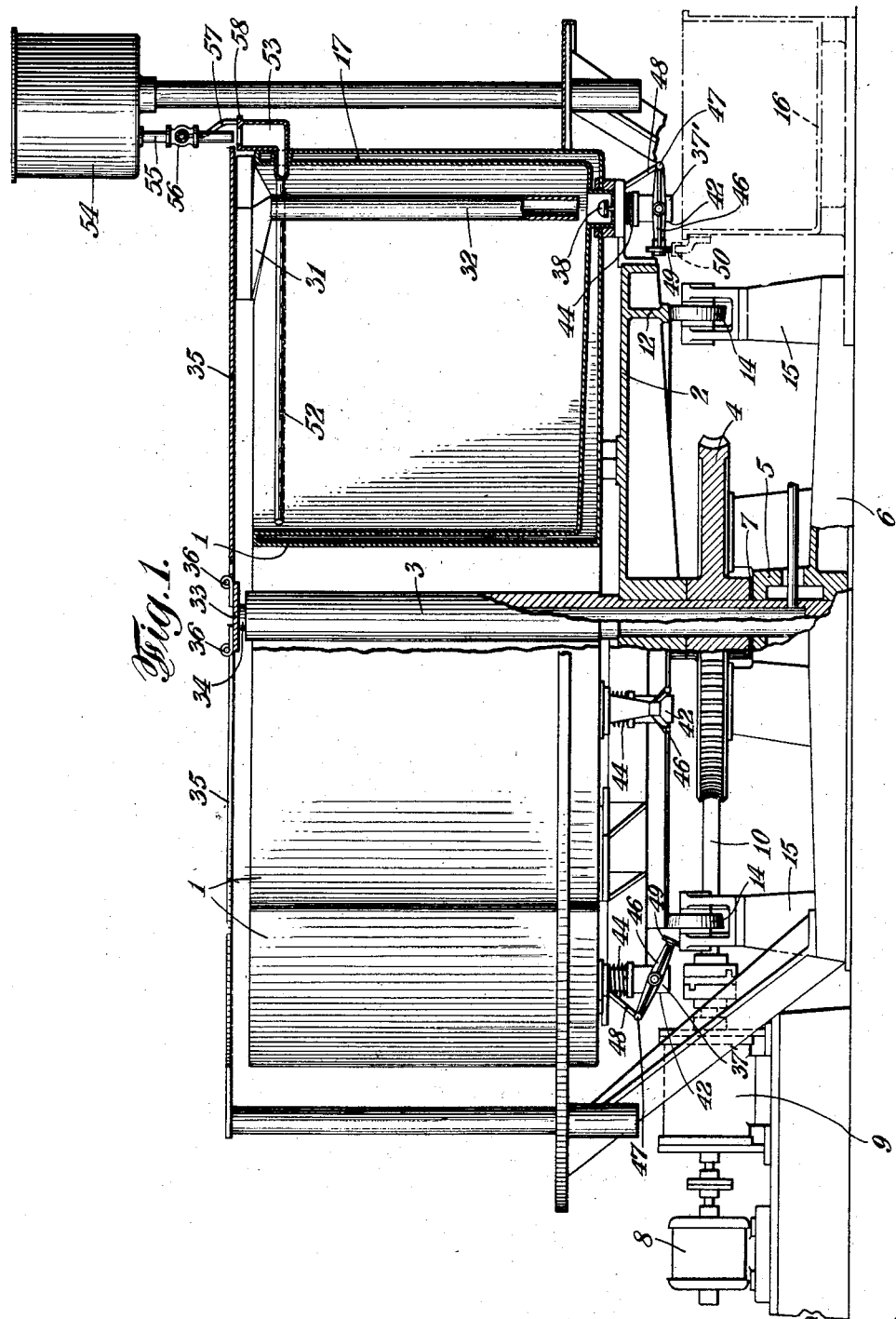

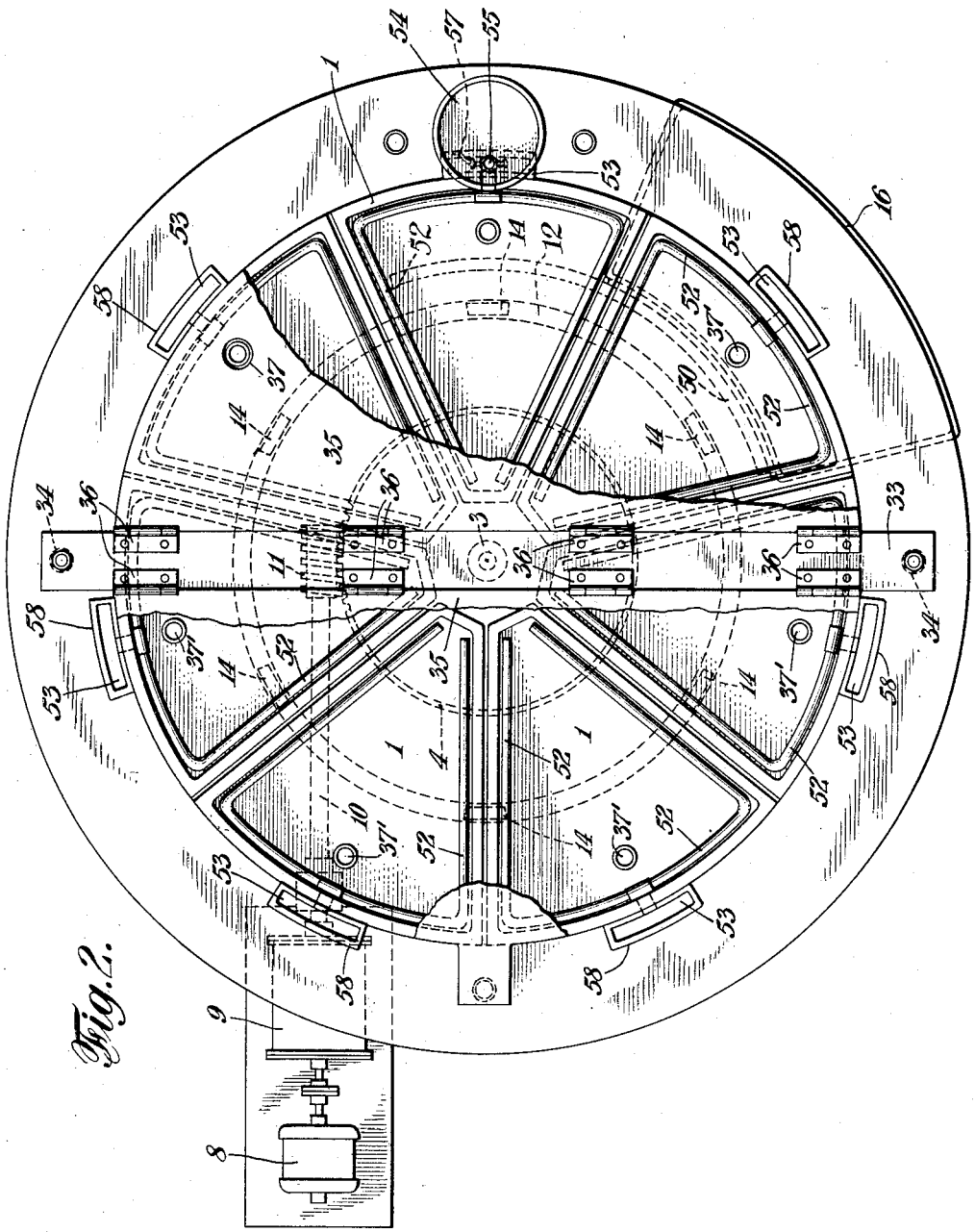

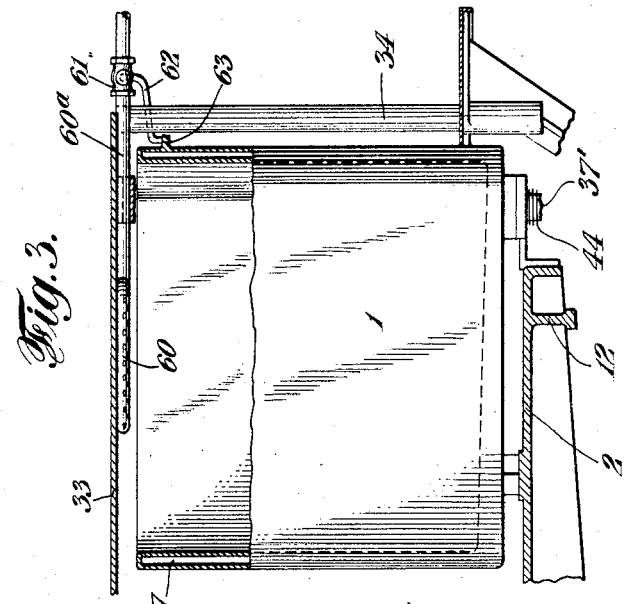
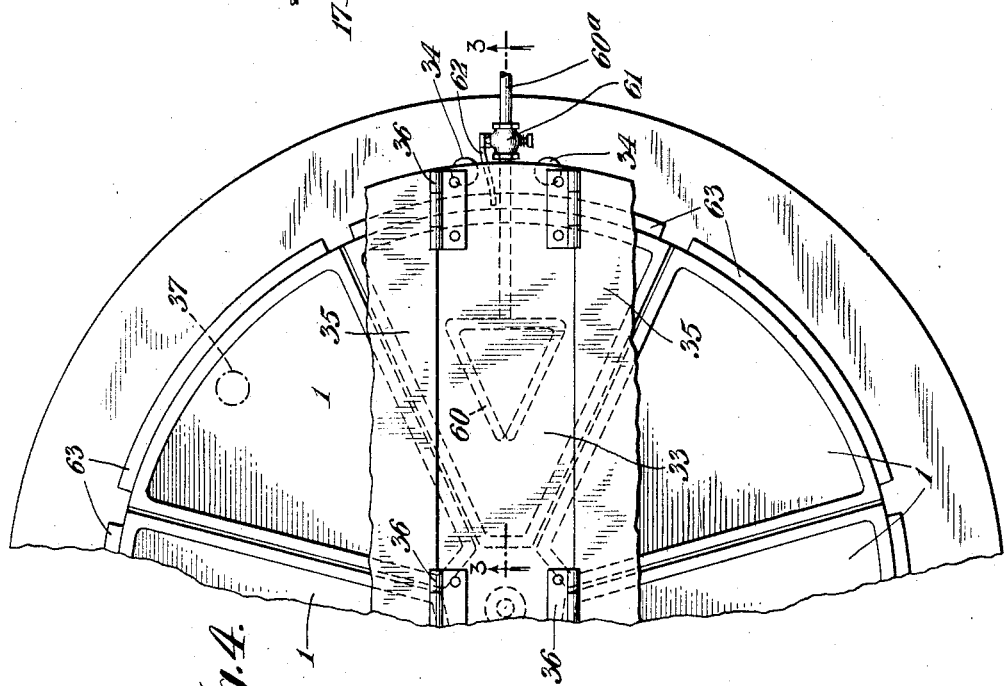

1,638,835

UNITED STATES PATENT OFFICE.

ALBERT J. DAVIS, OF NEW YORK, N. Y.

PASTEURIZING APPARATUS.

Application filed June 9, 1926. Serial No. 114,639.

My invention relates to Pasteurizing apparatus. In Pasteurizing milk, the latter is heated to a suitable temperature, say about 145° F., and held for a definite time, say about thirty minutes, at that temperature. This treatment causes practically all of the bacteria in the milk to be destroyed. When the Pasteurized milk is discharged from the holder or holders in which Pasteurization takes place, a certain amount of scum and foam adhere respectively to the sides and bottom of the holder. This scum and foam contains certain undesirable bacteria which are destroyed only at higher temperatures than the usual Pasteurization temperature.

The principal object of this invention is to provide improved means whereby said foam and scum are removed from the holder after each emptying thereof so as to prevent objectionable accumulation of the said bacteria in the Pasteurized milk.

Other objects, features and advantages of the invention will be apparent from the following detailed description and the appended claims.

The accompanying drawings forming a part of this specification illustrate two embodiments of the invention.

In the drawings,

Figure 1 is a view partly in elevation and partly in section of one of the said embodiments of the invention.

Figure 2 is a plan view of the same, the cover and milk receiving pans for the milk holders being omitted.

Figure 3 is a fragmentary view partly in elevation and partly in section of another embodiment of the invention; and Figure 4 is a plan view of the device of Fig. 3.

Referring to Figs. 1 and 2, a plurality of milk holders 1 are arranged symmetrically about a common axis, the holders as shown being sector-shaped in horizontal cross section and being supported by a base plate or frame 2 which is mounted for rotation about a stationary shaft 3 whose axis is coincident with the vertical axis about which the holders are arranged. The base plate 2, as shown, rests upon the hub of worm gear 4 which latter rests upon the projecting portion 5 of the bed plate 6, a flat bearing 7 of anti-friction material being arranged between the gear 4 and the frame portion 5 of the bed plate to permit rotation of the gear 4 without undue friction. The gear 4 is secured, as by a key (not shown), to the member 2 so that rotation of the gear 4 effects rotation of the member 2 and the milk holders 1 about the axis of the shaft 3. The gear 4 is, as shown, driven from a motor 8 which is connected with the gear 4 through reduction gearing 9, shaft 10 and worm 11. The holder is rotated at such a speed that it makes one complete revolution in somewhat over the Pasteurizing period, say in about 42 minutes where seven holders are employed, as shown. The reason the period of rotation exceeds the Pasteurizing period is to enable suitable time for the emptying, cleaning and refilling of each holder during a single rotation after Pasteurizing of a supply of milk in the holder is complete. To avoid undue strain upon the member 2, I provide the said member with an annular depending rail 12 which rests upon rollers 14 carried by suitable standards 15 arising from the bed plate 6. A stationary tank 16 is arranged to receive the Pasteurized milk discharged from the holder 1.

In order to maintain the milk in the holders 1 at the desired temperature, each of the holders may be provided with a jacket 17 through which a heating fluid may be circulated as shown for example in my United States Patent No. 1,578,267, dated March 30th, 1926.

Referring to Fig. 2, each holder is provided at its outer portion with a pan 31 into which the milk is supplied and from which it enters the holder through a vertical conduit 32 having an outlet near the bottom of the holder. This arrangement permits the supply of milk to the holder substantially without foam. The holders are provided with a cover which, as shown, comprises a central bridge portion 33 carried by suitable supports 34 and movable side portions 35 hinged to the portion 33, as at 36. The cover has an inlet opening 37 through which milk is supplied to the successive pans 31 as they pass under the said inlet.

To permit discharge of the milk from the various holders into the receiving tank 16, the holders are provided with outlet valves 37' shown in detail in my said Patent No. 1,578,267. These valves, as shown, comprise a movable valve member 38 connected to a sleeve 42 which fits for sliding movement upon the outlet pipe for the holder. A spring 44 tends to hold the sleeve 42 depressed so as to yieldingly hold the valve 38 in closed position. To permit opening of the valve, the sleeve 42 is connected to a lever 46 pivoted at 47 to arm 48 carried by the frame 2. The lever 46 carries at its free end a roller 49 which is arranged to travel on a cam 50 on the receiving tank 16. This cam is designed so that as the outlet valve for each holder 1 comes completely into register with the tank 16, the lever 46 is elevated by the cam to open the outlet valve and hold the same open during the rotation of the holder to permit the complete discharge of the milk from the holder, the cam permitting the spring 44 to automatically close the outlet valve after the rinsing of the holder as hereinafter described.

To remove the scum and foam adhering to the inside of the tank after the discharge of the pasteurized milk therefrom, I provide washing apparatus which, as shown in Figs. 1 and 2, includes a spraying device 52 carried by each of the holders 1. The spraying device as shown is in the form of a pipe arranged inside the holder near the top thereof and close to the inner side wall of the holder. This pipe is provided with perforations so arranged as to direct a spray of cleansing fluid, such as water, against the side walls of the holder near the top of the said walls at a level above that at which the milk is held in the holder. The pipe 52 is carried by and communicates with a hollow chamber-like device 53 which extends part way around the holder, as shown, and is adapted to receive a supply of the cleansing water for a predetermined time during the rotation of the holders after the discharge of the pasteurized milk and before a new supply of milk to be Pasteurized is run into the holder. The water or other cleansing fluid is as shown carried in a tank or reservoir 54 which has a depending outlet pipe 55 adapted to register with the inlet to each receiver 53 during the rinsing period for the corresponding holder 1. The flow from the tank 54 is controlled by a valve 56 which is normally held in closed position by a spring (not shown). This valve is arranged to be opened by the coaction of its lever 57 with a cam 58 on each of the receiving devices 53; so that the valve 56 will be held open during the period the pipe 55 is in register with each of the receivers 53 but will automatically close as soon as said pipe has moved out of register with the said receiver. The water or other rinsing fluid received by the device 53 is discharged from the perforated pipe 52 as a spray against the side walls of the holder 1, washing down the scum and carrying with it also such foam as adheres to the bottom of the holder as it passes out of the bottom of the tank through the outlet valve 37′, the movable member 38 of which is held open, as by cam 50, until the rinsing or washing of the tank is completed.

In Fig. 3 I have shown a rinsing or washing nozzle 60 which is secured in a stationary position with respect to the various holders 1. In this construction the same spraying device is used for all of the holders 1. As shown, it is secured in fixed position to the underside of the bridge 33 of the cover. The nozzle 60 is in the form of a conduit which is provided with perforations so arranged as to direct a spray of the cleansing water or other fluid against the inner side walls of each holder near the top thereof as the holder passes under the said nozzle. The latter may be in communication through pipe 60ª with a suitable source of water under high pressure so that the spray may be directed against the side walls of the tank with considerable force. The pipe 60ª is, as shown, provided with a valve 61 which is normally held in closed position, as by a spring (not shown), the said valve being provided with a lever 62 operated by cam 63 carried by each of the holders 1 so as to cause flow of the rinsing water through the nozzle 60 when a holder is in operative position under the same and to automatically cause the flow of the water to be shut off while the holder passes from operative position with respect to the nozzle 60 and the next holder passes into operative position with respect to the same. As with the other form of invention described herein, the spray from the perforated washing device 60 washes the scum down the sides of the tank and out of the bottom, the cleansing fluid also carrying with it any foam which may have adhered to the bottom of the holder.

While I have described two embodiments of my invention, it is understood that I am not to be limited thereto and that changes within the scope of the appended claims may be made without departing from the spirit of the invention.

Having thus described my invention, what I claim as new and desire to secure by Letters Patent of the United States is:—

1. The combination of a liquid holder, means for supporting the same in upright fluid holding position, and means for washing the interior of the holder while so supported, said means having a control valve, means for producing a relative movement between said holder and said valve, and automatic means for opening said control valve when said holder reaches a predetermined position with respect to said valve.

2. The combination of a liquid holder having an outlet valve, means for supporting the holder in upright position, and means for washing the interior of the holder while so supported, said means including a spraying device within the holder and a source of fluid supply including a control valve, means for producing a relative movement between said source of fluid supply and said holder whereby they are moved into and out of operative relation to each other, and automatic means for opening said control valve when the source of fluid supply and holder are in operative relation to each other.

3. The combination of a plurality of milk holders arranged in upright fluid holding position and rotatable about a common vertical axis, means for washing the interiors of the holders while so arranged, and means for rotating said holders about said axis whereby said washing means are arranged to successively cleanse said holders, and automatic means for effecting the flow of fluid from said washing means.

4. The combination of a plurality of milk holders arranged in upright fluid holding position and rotatable about a common vertical axis, washing means including means for directing a spray of cleansing liquid on the interiors of the holders, and means for rotating said holders about said axis, whereby said washing means are arranged to successively cleanse said holders.

5. In apparatus for Pasteurizing milk, the combination of a milk holder having an outlet valve, automatic means for controlling the opening and closing thereof, means for washing the interior of the holder, said washing means including a member arranged to direct a spray of cleansing fluid upon the side walls of the holder, a source of fluid supply for said member, and a valve for controlling the flow of fluid from said source, means for producing a relative movement between said holder and source of fluid supply whereby they are moved into and out of operative relation with respect to each other, and automatic means for opening said control valve a predetermined interval of time after the opening of said outlet valve.

6. In apparatus for Pasteurizing milk, the combination of a milk holder having an outlet valve, automatic means for controlling the opening and closing thereof, means for washing the interior of the holder, said washing means including a member arranged to direct a spray of cleansing fluid upon the side walls of the holder, a reservoir for said member, and a valve for controlling the flow of fluid from said reservoir, means for producing a relative movement between said holder and reservoir whereby they are moved into and out of operative relation with respect to each other, and automatic means for opening said control valve a predetermined interval of time before the closing of said outlet valve.

7. The combination of a plurality of milk holders rotatable about a common vertical axis, each having an outlet valve, means for successively opening said valves, means for washing the interiors of the holders, means for rotating said holders about said axis whereby said washing means are arranged to successively cleanse said holders after the discharge of milk from the respective holders, and automatic means intermittently operated for controlling the flow of fluid from said washing means.

8. The combination of a plurality of milk holders rotatable about a common vertical axis, each having an outlet valve, means for successively opening said valves, means for washing the interiors of the holders, and means for rotating said holders about said axis whereby said washing means are arranged to successively cleanse said holders after the discharge of milk from the respective holders.

9. The combination of a plurality of milk holders rotatable about a common vertical axis, each having an outlet valve, means for successively opening said valves, washing means including means for directing a spray of cleansing liquid on the interior of the holders, and means for rotating said holders about said axis whereby said washing means are arranged to successively cleanse said holders after the discharge of milk from the respective holders.

10. The combination of a plurality of milk holders rotatable about a common vertical axis, each having an outlet valve, means for successively opening said valves, washing means including means for directing a spray of cleansing liquid on the interior of the holders, means for rotating said holders about said axis whereby said washing means are arranged to successively cleanse said holders after the discharge of milk from the respective holders, and automatic means for effecting the flow of fluid from said washing means.

11. The combination of a plurality of milk holders rotatable about a common vertical axis, each having an outlet valve, automatic means for successively opening said valves, washing means including means for directing a spray of cleansing liquid on the interior of the holders, means for rotating said holders about said axis whereby said washing means are arranged to successively cleanse said holders after the discharge of milk from the respective holders, and automatic means for effecting the flow of fluid from said washing means when the latter are so arranged including a fluid control valve and cams coacting with said valve and carried by the holders.

In testimony whereof, I have signed my name to this specification.

ALBERT J. DAVIS.